United States Patent
Murata et al.

(10) Patent No.: US 7,124,420 B2
(45) Date of Patent: Oct. 17, 2006

(54) PICKUP DEVICE HAVING A HEAT-RADIATION PATH

(75) Inventors: Masaya Murata, Tokorozawa (JP); Yuichi Mizuuchi, Tokorozawa (JP); Masayuki Koyama, Tokorozawa (JP); Takehiko Hayashi, Tokorozawa (JP); Tsuyoshi Iwano, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 460 days.

(21) Appl. No.: 10/680,412

(22) Filed: Oct. 8, 2003

(65) Prior Publication Data
US 2004/0117809 A1    Jun. 17, 2004

(30) Foreign Application Priority Data
Oct. 8, 2002    (JP)    ............................. 2002-294753

(51) Int. Cl.
*G11B 7/08*    (2006.01)
*G11B 5/40*    (2006.01)
(52) U.S. Cl. ..................................... 720/671
(58) Field of Classification Search ............... 720/658, 720/659, 671
See application file for complete search history.

(56) References Cited

U.S. PATENT DOCUMENTS

| 4,193,091 A | 3/1980 | Kleuters et al. | ......... 358/128.5 |
| 5,012,463 A | 4/1991 | Farnsworth et al. | ........ 369/100 |
| 5,235,591 A | 8/1993 | Nakamura et al. | .......... 369/199 |
| 5,600,619 A | 2/1997 | Takekoshi et al. | .......... 369/112 |
| 5,727,009 A | 3/1998 | Tajiri et al. | .................... 327/43 |
| 6,847,499 B1 * | 1/2005 | Choi et al. | ................... 359/819 |

FOREIGN PATENT DOCUMENTS

| DE | 199 16 573 A1 | 10/2000 |
| EP | 1 148 482 A1 | 10/2001 |
| WO | WO 02 29796 A | 4/2002 |

OTHER PUBLICATIONS

European Search Report dated Feb. 16, 2004.
Patent Abstracts of Japan vol. 10, No. 160 (P-465), Jun. 7, 1986 & JP 61 013451 A (Ricoh KK), Jan. 21, 1986.
European Office Action dated Jul. 6, 2005.

* cited by examiner

*Primary Examiner*—Julie Anne Watko
(74) *Attorney, Agent, or Firm*—Armstrong, Kratz, Quintos, Hanson & Brooks, LLP

(57) ABSTRACT

A communication hole (55) is provided in a pickup base (51). A laser light source (61) is provided at an end of the communication hole (55). A grating (71) is provided at another end of the communication hole (55). The communication hole (55) is provided with a heat radiation path (81) which connects the inside of the communication hole (55) with the outside of the pickup base (51). Heat generated from the laser light source (61) is radiated from the heat radiation path (81).

11 Claims, 10 Drawing Sheets

PICKUP DEVICE HAVING A HEAT-RADIATION PATH

BACKGROUND OF THE INVENTION

1. Field of the Invention

The present invention relates to a pickup device which, for example, writes or reads data into or from an optical recording medium.

2. Description of Related Art

There has been a known pickup device which writes or reads data into or from an optical recording medium, e.g., optical disks such as a DVD (Digital Versatile Disk), a CD (Compact Disk), and the like.

The pickup device is constituted by including a laser light source as a light source which irradiates a light beam onto an optical disk, a grating as an optical element provided in the middle of an optical path extending toward the optical disk from the laser light source, and a pickup base on which the laser light source and the grating are mounted.

The pickup base is provided with a communication hole. The communication hole has, at an end, a light source attachment for attaching the laser light source, and an optical element attachment for attaching an optical element such as a grating or the like is provided at another end of the pickup base. The laser light source is attached to the light source attachment, and the grating is attached to the optical element attachment. The laser light source and the grating are provided to be coaxial with each other.

Provided on the pickup base are a beam splitter which reflects laser light emitted from the laser light source toward the optical disk, a lens which converges laser light, and an optical element such as a light detector which detects reflection light from the optical disk.

The grating, for example, serves to diffract the laser beam from the laser light source and split the light beam into one main beam and two sub-beams. The sub-beams split by the grating are irradiated at a predetermined angle onto data tracks of the optical disk. The reflection light thereof is detected by the optical detector of the pickup device. Based on a detection signal from the optical detector, tracking adjustment or the like is performed on the main beam.

The laser light source generates heat when it irradiates laser light. When the laser light source and the grating are thus respectively provided at one end and another end of the communication hole, however, the heat generated from the laser light source easily accumulates in the communication hole, so that the temperature of the laser light source increases. As the temperature of the laser light source increases, a problem arises in that the characteristics of the laser light source deteriorate or the lifetime thereof is shortened.

It is considered that, to radiate the heat of the laser light source, the pickup base may be formed of metal material having a good heat transmission characteristic, and a heat-radiating plate may be provided for the laser light source. In recent years, however, the pickup base has been made of synthetic resin owing to demands for cost reduction. In addition, laser light sources, which are compatible with both of the DVD and CD or write data onto optical disks, have come to be used. The amount of heat generated from these laser light sources is so large that the heat-radiating plate is not enough to achieve sufficient heat radiation for these laser light sources.

SUMMARY OF THE INVENTION

An object of the present invention is to provide a pickup device capable of preventing increase in temperature of a light source, at low manufacturing costs.

According to the present invention, a pickup device includes: a light source which irradiates a light beam onto an optical recording medium; and a casing including an optical element provided in the middle of an optical path oriented from the light source to the optical recording medium, and a communication hole having an end at which the light source is provided and an another end at which the optical element is provided, the communication hole connecting the light source to the optical element, and is characterized in that the communication hole has a heat radiator which radiates, to outside, heat between the light source and the optical element.

DETAILED DESCRIPTION OF PREFERRED EMBODIMENT(S)

Hereinafter, embodiments of the present invention will be explained with reference to attached drawings.

(First Embodiment)

Figure 1:
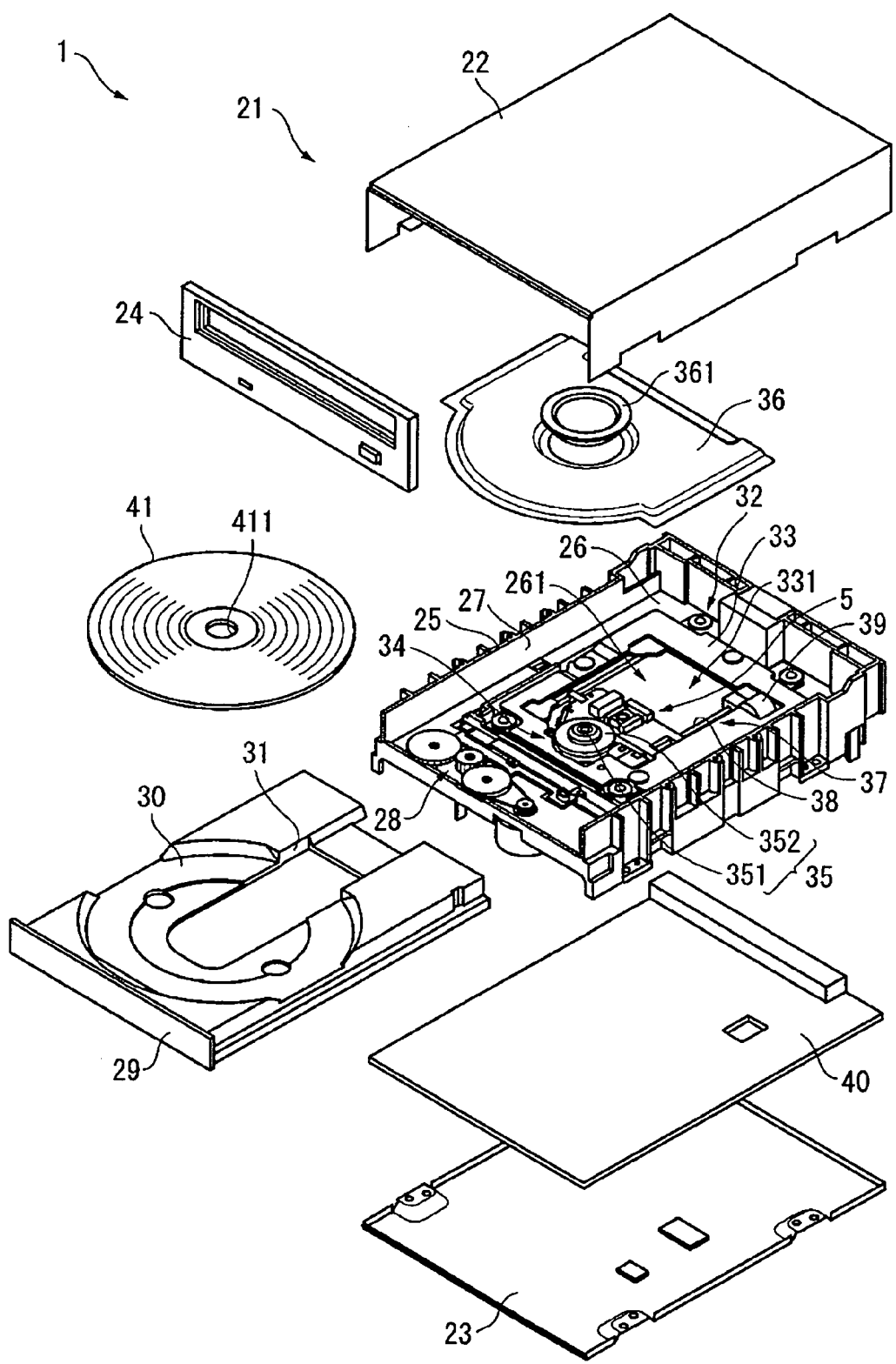
FIG. 1 is an exploded perspective view showing a disk apparatus having a pickup device according to a first embodiment of the present invention.

FIG. 1 is an exploded perspective view of a disk apparatus which has a pickup device according to a first embodiment and reproduces data recorded on an optical disk such as a DVD or a CD or records data onto the optical disk.

A disk apparatus 1 includes an outer case 21, an inner case 25 provided inside the outer case 21, a disk tray 29 which is provided to be advanceable and retractable relative to the inner case 25 and on which an optical disk 41 is set as an optical recording medium, a main unit 32 which is provided in the inner case 25 and reproduces or records data from or onto the optical disk 41, and a circuit board 40 including an electronic component which controls the operation of the main unit 32.

The outer case 21 includes an upper case 22 whose bottom and front sides are open as shown in FIG. 1, a lower case 23 which closes the bottom side of the upper case 22, and a decorative panel 24 which closes the front side of the upper case 22. The outer case 21 has a flat and rectangular parallelepiped shape as a whole.

The inner case 25 is open in its upper and front sides, and has a bottom 26 having an opening 261 at the substantial center thereof and side surfaces 27 standing on the bottom 26.

The disk tray 29 is substantially flat and has a tray recess 30 provided on the upper side thereof, like a circular concave whose diameter increases upward, to set an optical disk 41 in the tray recess. The disk tray 29 has a substantially rectangular opening 31 at the substantial center thereof. The disk tray 29 is advanced and retracted by a tray drive unit 28 provided in the inner case 25.

The main unit 32 includes a base unit 33 having an opening 331 at the center and set in the inner case 25, a rotation drive unit 34 provided on the base unit 33 to rotate the optical disk 41, a pickup device 5 which moves the opening 331 of the base unit 33 from an edge to another edge, irradiates a laser beam on a recording part provided in the lower surface side of the optical disk 41, and detects a reflection light therefrom, and a movement unit 37 which moves the pickup device 5.

The base unit 33 is formed like a flat frame and is provided, with the opening 331 of the base unit 33 overlapped on the opening 261 of the inner case 25.

The rotation drive unit 34 includes a turntable 35 which rotates with the optical disk 41 set on, and a spindle motor (not shown) as a torque source which rotates and drives the turntable 35. The turntable 35 has a rotation shaft 351 inserted in a center hole 411 of the optical disk 41, and a flange 352 protruded from the outer circumference of the rotation shaft 351, to support the periphery of the axial hole of the optical disk 41. Once the optical disk 41 is set on the disk tray 29 and is moved to the inside of the inner case 25, the optical disk 41 is set on the turntable 35. The upper surface of the optical disk 41 is pressed down by a rotor 361 provided rotatably by a support member 36 bridged between the side surfaces 27 of the inner case 25. With the optical disk 41 sandwiched between the turntable 35 and the rotor 361, the optical disk 41 is rotated by the drive force of the spindle motor.

The movement unit 37 includes a pair of guide shafts 38, and a movement motor 39. The guide shafts 38 are provided such that the axial direction of each guide shaft extends from an edge to another edge of the opening 331 of the base unit 33. The guide shafts 38 are inserted or engaged in the pickup device 5. The pickup device 5 is moved from an edge to another edge of the base unit 33 by the drive force of the movement motor 39.

The circuit board 40 is provided under the pickup device 5 at a predetermined distance kept from the pickup device 5. The circuit board 40 includes electronic components for controlling rotations of the movement motor 39 and the spindle motor and for controlling the pickup device 5.

Figure 2:
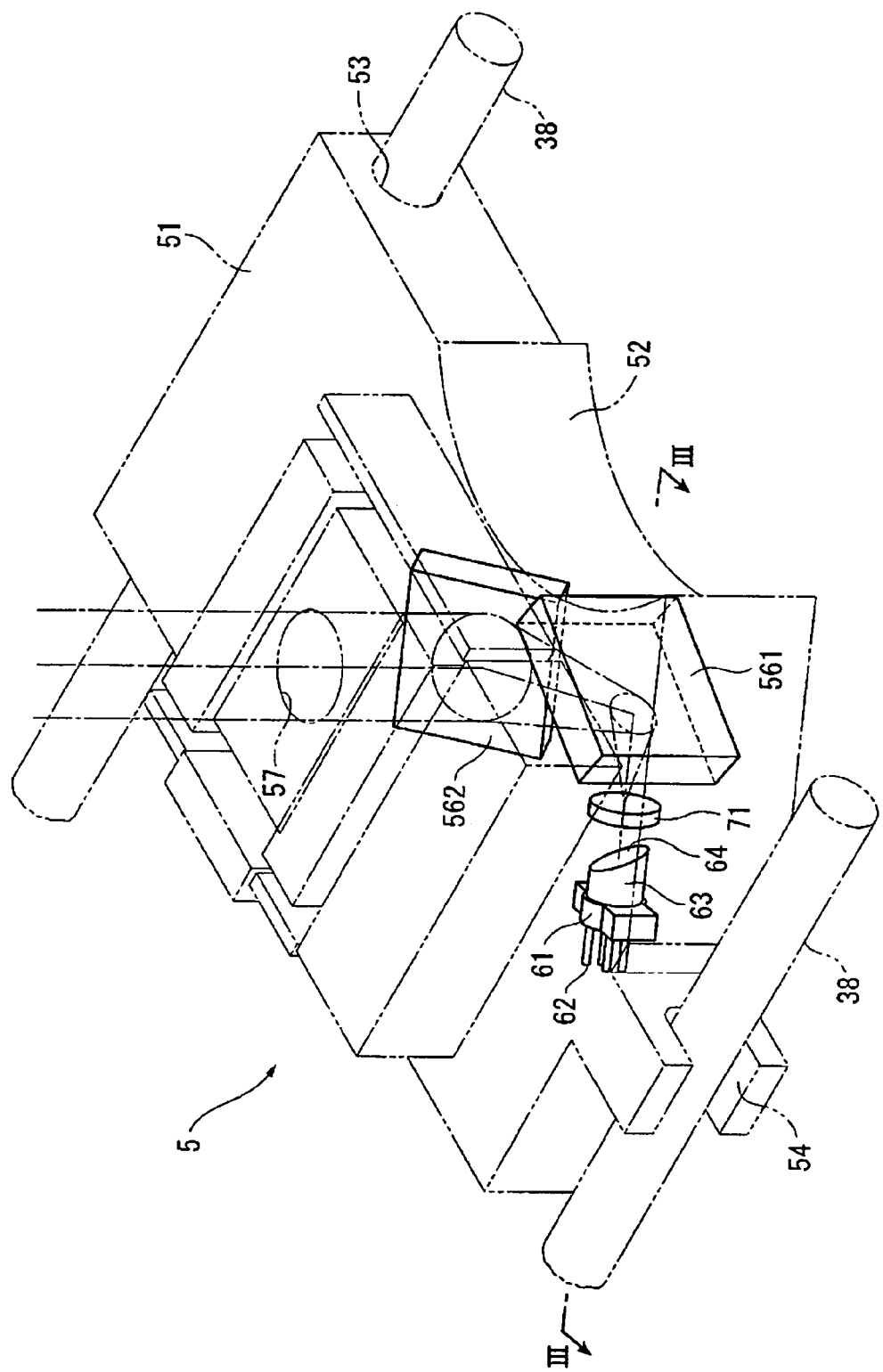
FIG. 2 is a perspective view showing through the inside of the pickup device according to the first embodiment.

FIG. 2 shows the pickup device 5.

The pickup device 5 has a pickup base 51 as a casing. The pickup base 51 is made of synthetic resin etc. and has a shape substantially like a thick plate, an edge side of which is formed into an arc 52 to fit the circular shape of the turntable 35.

The pickup base 51 is provided with an insertion hole 53 in which one of the guide shafts 38 of the movement unit 37 is inserted, in the right side in FIG. 2. In the left side, an engaging part 54 having an U-shaped cross-section is provided to sandwich inside the other guide shaft 38.

The pickup base 51 has a laser beam emission part 57 which emits a laser beam toward the optical disk 41, in the side of the surface opposed to the optical disk 41.

Figure 3:
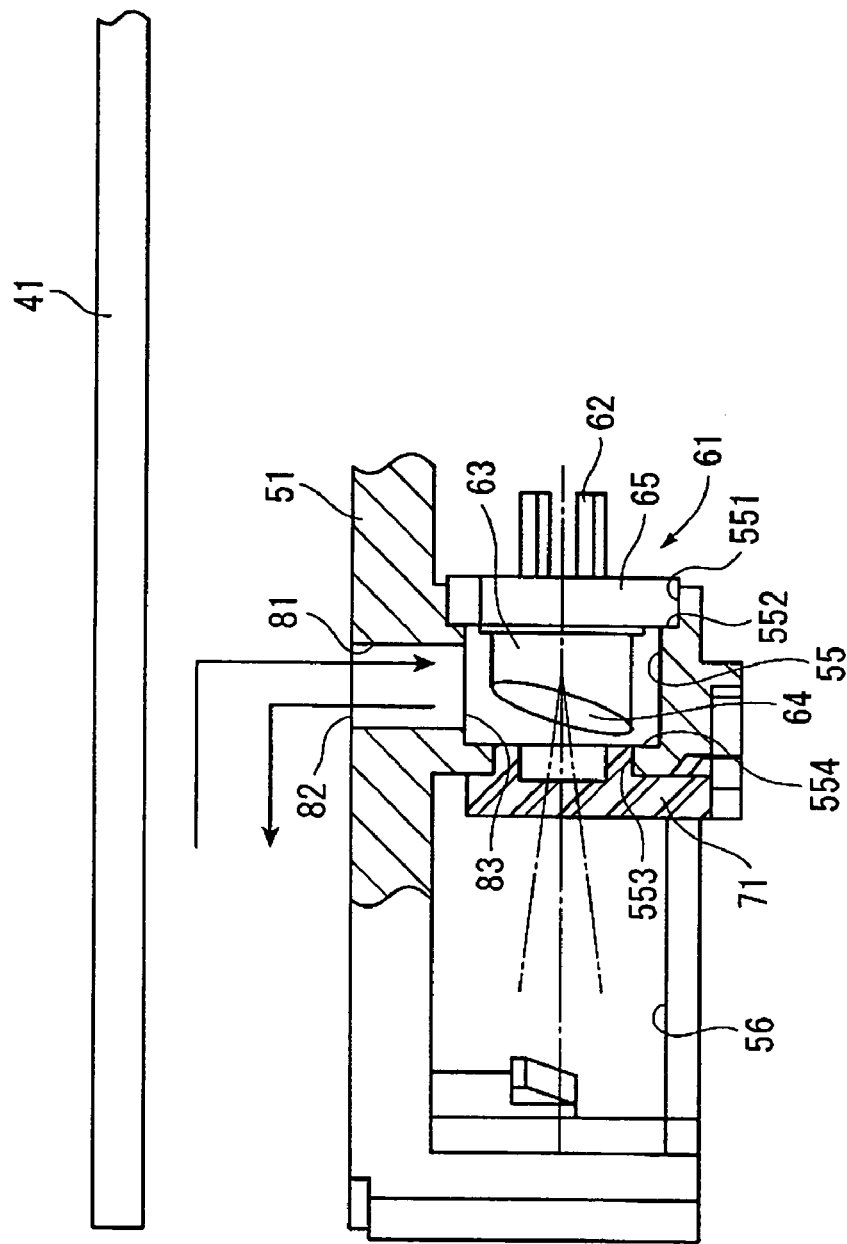
FIG. 3 is a cross-sectional view showing the pickup device cut along the line III—III in FIG. 2 according to the first embodiment.

The pickup base 51 is provided with a communication hole 55 having an end to which a laser light source 61 is attached and another end to which a grating 71 is attached. FIG. 3 is a cross-sectional view of the pickup base cut along line III—III in FIG. 2 and shows a cross-sectional view of the communication hole 55.

The communication hole 55 has a laser light source attachment 551 to which the laser light source 61 as a light source is attached, in one end side, as well as an optical element attachment 553 to which the grating 71 as an optical element is attached, in another end side.

The laser light source attachment 551 is formed by increasing the diameter thereof from the inside of the communication hole 55 toward the outside of the pickup base 51, by a gap 552. The laser light source 61 is attached to the laser light source attachment 551 in such a manner that a laser emission surface 64 is faced to the inside of the communication hole 55, and a base end surface 65 where a connector pin 62 is provided is faced to the outside of the pickup base 51 from the communication hole 55.

The laser light source 61 has a laser emission cylinder 63 protruded from the base end surface 65 where the connector pin 62 is provided, and the laser emission surface 64 is provided on the top end surface of the laser emission cylinder 63. The laser light source 61 includes a DVD laser chip which outputs a laser beam for reproducing data from DVDs, as well as a CD laser chip for outputting a laser beam for reproducing data from CDs. Thus, the laser light source can output laser beams of two different wavelengths.

The optical element attachment 553 is formed by reducing the diameter thereof from the inside of the communication hole 55 by a gap 554. The grating 71 is attached to the optical element attachment 553 in such a manner that the grating 71 receives vertically the laser beam emitted from the laser emission surface 64 of the laser light source 61.

The grating 71 is a diffraction grating which diffracts the laser beam from the laser light source 61, and splits the laser beam into one main beam and two sub-beams.

Since the laser light source 61 is attached to one end of the communication hole 55 and the grating 71 is attached to another end, the laser light source 61 and the grating 71 can be stabled in a coaxial layout.

The communication hole 55 has a heat radiation path 81 like a hole connecting the inside of the communication hole 55 with the outside of the pickup base 51, as a heat radiator which radiates, to the outside, heat generated from the laser light source 61 and accumulating inside the communication hole 55.

The heat radiation path 81 is provided across the axis of the communication hole 55. This path is a hole having a circular cross-section and is formed by linearly connecting an inner opening 83 opened in the side of the communication hole 55, and an outer opening 82 opened in the outer side of the pickup base 51. The axial direction of the heat radiation path 81 extends upwards in the vertical direction during normal use of the pickup device 5.

The outer opening 82 is open to the optical disk 41. The inner opening 83 is open opposite to the side surface of the laser emission cylinder 63.

The heat radiation path 81 is formed like a hole when the pickup base 51 is formed by injection molding.

The communication hole 55 communicates with a laser beam path 56 formed inside the pickup base 51 via the optical element attachment 553. The laser beam path 56 is connected to the laser beam emission part 57.

The laser beam path 56 is provided with a half mirror 561 which reflects vertically the laser beam from the laser light source 61 in parallel with one surface of the pickup base 51, and a reflection mirror 562 which reflects vertically the reflection light from the half-mirror 561 toward the laser beam emission part 57. Also provided is a detector (not shown) or the like which detects the reflection light from the optical disk 41.

Explanation will now be made of data reading from the optical disk 41 in the disk apparatus 1 constructed in the structure as described above.

The disk tray 29 is pulled out of the outer case 21 and the inner case 25, and an optical disk 41 is set on the disk tray 29. The disk tray 29 on which the optical disk 41 is set is housed inside the inner case 25. The optical disk 41 is then sandwiched between the turntable 35 and the rotor 361, and the optical disk 41 is rotated by rotation of the turntable 35. At this time, a laser beam is emitted from the pickup device 5 toward the optical disk 41, and the reflection light from the optical disk 41 is detected by the pickup device 5. Data is read from the optical disk 41 by thus detecting the reflection light. Also, the pickup device 5 irradiates a laser beam onto a predetermined part of the optical disk 41 as the pickup device 5 is moved by the movement unit 37. Predetermined data is then read sequentially from the optical disk 41.

Explained next will be radiation of heat generated from the laser light source 61 in the pickup device 5 constructed in the structure as described above.

When a laser beam is emitted from the laser light source 61, the laser light source 61 generates heat. The heat generated from the laser light source 61 is transferred to the air in the communication hole 55 between the laser light source 61 and the grating 71. The air heated by the transferred heat escapes to the outside of the communication hole 55 via the heat radiation path 81. At this time, the heat radiation path 81 is oriented upward during normal use of the pickup device 5, and therefore, the air heated by the transferred heat easily rises and escapes to the outside.

Meanwhile, the cool air flows into the communication hole 55 from the outside of the pickup base 51 via the heat radiation path 81. At this time, the outer opening 82 of the heat radiation path 81 is open against the rotation surface of the optical disk 41. Hence, an air flow generated when the optical disk 41 rotates easily flows into the communication hole 55, passing through the heat radiation path 81. The laser light source 61 then contacts the cool air which flows in through the heat radiation path 81. The heat generated from the laser light source 61 is transferred to the air so that increase of the temperature of the laser light source 61 is restricted.

The pickup device 5 constructed in the structure as described above can achieve the following advantages.

(1) The pickup device 5 includes the laser light source 61 which irradiates a laser beam onto the optical disk 41, the grating 71 which is provided in the middle of the optical path extending from the laser light source 61 toward the optical disk 41, and the pickup base 51 having the communication hole 55 communicating the laser light source 61 and the grating 71 with each other, with the laser light source 61 and the grating 71 respectively provided at an end and another end of the communication hole 55. The communication hole 55 includes a heat radiator for radiating, to the outside, heat between the laser light source 61 and the grating 71.

According to this structure, the heat generated from the laser light source 61 is radiated from inside of the communication hole 55 by the heat radiator. Increase in temperature of the laser light source 61 can be restricted. Deterioration of characteristics and shortening of the lifetime due to temperature increase can be prevented by thus restricting the increase in temperature of the laser light source 61.

Since the heat generated from the laser light source 61 can be radiated by the heat radiator, the laser light source 61 can be used to emit both laser beams of two wavelength, one being for CDs and the other being for DVDs which cause a large amount of heat. If the laser light source 61 can thus emit laser beams of two wavelengths, there is no need for providing two individual laser light sources 61 respectively for DVDs and CDs. Accordingly, the pickup device 5 itself can have a small size.

In addition, the heat from the laser light source 61 can be radiated by the heat radiator, there is no need for forming the pickup base 51 from metal to radiate heat from the pickup base 51, either. The pickup base 51 can hence be formed of synthetic resin. If the pickup base 51 can be formed of synthetic resin, costs for materials can be reduced so cost reduction can be achieved.

(2) The heat radiator is the hole-like heat radiation path 81 which is formed traversing the axis of the communication hole 55 and communicates the inside of the communication hole 55 with the outside of the communication hole 55.

According to this structure, the heat generated from the laser light source 61 is transferred to the air, and the air to which heat is transferred escapes to the outside from the heat radiation path 81. The heat inside the communication hole 55 is radiated to the outside. Also, the external cool air flows into the communication hole 55, passing through the heat radiation path 81. The laser light source 61 then constantly contacts the cool air, so that the heat of the laser light source 61 is then transferred efficiently to the air. Thus, the laser light source 61 constantly contacts the cool air to transfer the heat of the laser light source 61 to the air, and the air to which the heat has been transferred flows to the outside through the heat radiation path. 81, so that increase in temperature of the laser light source 61 is restricted. Since the temperature increase of the laser light source 61 is restricted, deterioration of characteristics and shortening of the lifetime due to temperature increase can also be prevented.

(3) The heat radiation path 81 is opened against the rotation surface of the optical disk 41.

According to this structure, an air flow generated by rotation of the optical disk 41 easily flows into the communication hole 55, passing through the heat radiation path 81. The laser light source 61 can then contact constantly the cool air, so that the heat from the laser light source 61 is efficiently transferred to the cool air. Accordingly, the heat of the laser light source 61 is efficiently radiated, so that increase in temperature of the laser light source 61 is restricted. In addition, there is no need for providing a separate fan or the like to send wind into the communication hole 55. Therefore, the size of the device and costs can be reduced.

(4) In the heat radiation path 81, the outer opening 82 which is open to the outside of the communication hole 55 is open upward during normal use of the pickup device 5.

According to this structure, the air heated in the communication hole 55 by the heat transferred from the laser light source 61 easily escapes to the outside from the upper outer opening 82. In particular, the axis of the heat radiation path 81 is oriented upward in the vertical direction, so that the heated air easily escapes to the outside, passing through the heat radiation path. Therefore, the heat in the communication hole 55, which is generated from the laser light source 61, can be radiated to the outside efficiently. Note that the axis of the heat radiation path 81 need not always be oriented upward in the vertical direction but the heat radiation path 81 may be curved or the like. The outer opening 82 as an outlet of the heat radiation path 81, however, may be preferably open to the upside.

(5) Since the laser light source 61 is attached to an end of the communication hole 55 and the grating 71 is attached to the other end of the communication hole 55, the laser light source 61 and the grating 71 can be attached stable to be coaxial with each other. Due to provision of the communication hole 55, heat from the laser light source 61 can accumulate in the communication hole 55 between the laser light source 61 and the grating 71. However, the communication hole 55 is provided with the heat radiation path 81, so that heat from the laser light source 61 can be radiated. That is, the laser light source 61 and the grating 71 can be attached stably to be coaxial with each other, and increase in temperature of the laser light source 61 can be prevented.

(6) The inner opening 83 of the heat radiation path 81 is formed opposite to the side surface of the laser emission cylinder 63. A laser tip (not shown) inside the laser emission cylinder 63 has the greatest amount of heat in the laser light source 61. Therefore, if the inner opening 83 is opposed to the laser emission cylinder 63, the air heated by transferred heat easily flows immediately to the outside from the inner opening 83.

(7) The heat radiator is merely constituted by providing a hole-like heat radiation path 81, and formed at the same time when the pickup base 51 is formed by injection molding. The structure is thus simple and does not influence the costs.

(Second Embodiment)

Figure 4:
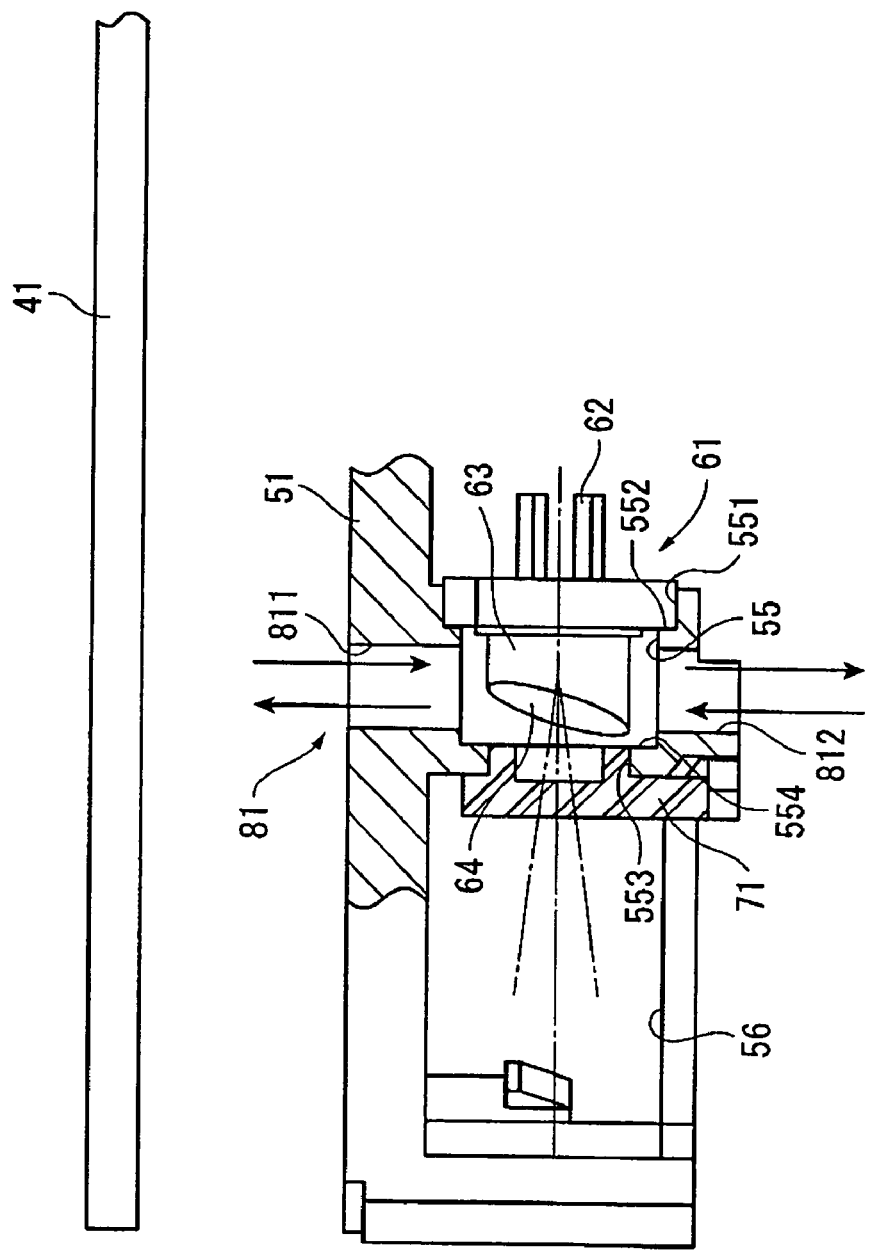
FIG. 4 is a cross-sectional view showing a second embodiment of the present invention, corresponding to FIG. 3.

FIG. 4 shows a second embodiment of the present invention. The basic structure of the second embodiment is the same as the first embodiment. The second embodiment, however, differs from the first embodiment in that two heat radiation paths are provided to be coaxial with each other, sandwiching the communication hole 55, in place of the heat radiation path 81 as a heat radiator.

Specifically, there are provided a first heat radiation path 811 penetrating the upper wall of the communication hole 55 and a second heat radiation path 812 penetrating the lower wall of the communication hole 55, as a set of heat radiation paths 81. The first and second heat radiation paths 811 and 812 have their own center axes situated substantially collinear with each other.

According to this structure, the following advantage can be achieved in addition to the advantages (1) to (7) of the first embodiment.

(8) The heat radiation paths 81 include at least one set of heat radiation paths whose center axes are substantially collinear with each other.

In this structure, the air easily passes through the first heat radiation path 811 and the second heat radiation path 812. Then, the external air is let flow sequentially into the communication hole 55, and the air heated by the heat from the laser light source 61 also easily goes to the outside. For example, the air heated by the heat from the laser light source 61 goes to the outside passing trough the first heat radiation path 811, and simultaneously, the external cool air easily introduced and flows in through the second heat radiation path 812. In addition, the air flow generated by rotation of the optical disk 41 easily goes out of the second heat radiation path 812, passing though the communication hole 55 from the first heat radiation path 811. Thus, an inlet and an outlet of the air may be created by the first and second heat radiation paths 811 and 812, so that a flow of the air can be easily created. Accordingly, the heat in the communication hole 55, which is generated from the laser light source 61, can be efficiently radiated to the outside. As a result, increase in temperature of the laser light source 61 can be restricted.

Needless to say, the heat radiation paths 81 need not be limited to two but more heat radiation paths may be provided.

(Third Embodiment)

Figure 5:
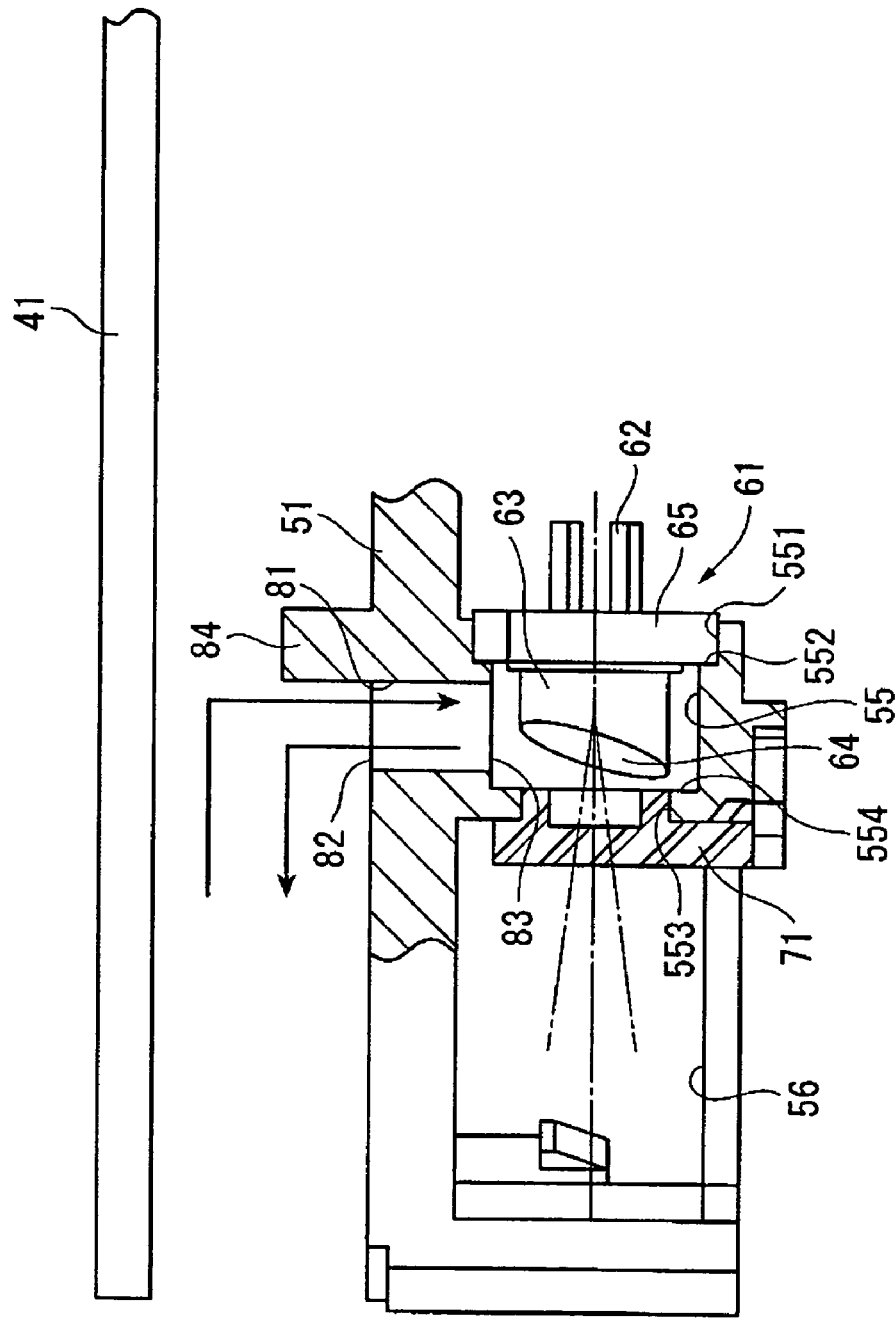
FIG. 5 is a cross-sectional view showing a third embodiment of the present invention, corresponding to FIG. 3.

FIG. 5 shows a third embodiment of the present invention. The basic structure of the third embodiment is the same as the first embodiment. The third embodiment, however, differs from the first embodiment in that the heat radiation path 81 as a heat radiator is provided with an air flow receiver 84.

That is, the air flow receiver 84 having a wall facing the flow of the air generated by rotation of the optical disk 41 is provided at an edge of the outer opening 82 of the heat radiation path 81.

The wall opposed to the air flow is flat and parallel to the axis of the heat radiation path 81.

The air flow receiver 84 is formed so as to stand integrally on the pickup base 51.

According to this structure, the following advantage can be achieved in addition to the advantages (1) to (7) of the foregoing embodiments.

(9) The air flow receiver 84 having the wall facing the flow of the air generated by rotation of the optical disk 41 is provided at an edge of the outer opening 82 open to the rotation surface of the optical disk 41 of the heat radiation path 81.

In this structure, the air flow generated by rotation of the optical disk 41 strikes the air flow receiver 84 and easily flows into the communication hole 55 from the heat radiation path 81. The external cool air then flows into the communication hole 55, so that heat of the laser light source 61 is efficiently transferred to the air. Accordingly, increase in temperature of the laser light source 61 can be restricted.

The wall of the air flow receiver 84, which receives the air flow, may be curved like an arc such that the surface thereof facing the heat radiation path 81 is concave inside. Alternatively, the air flow receiver 84 may be tilt toward the heat radiation path 81. In this structure, the received air flow can be easily introduced into the heat radiation path 81.

(Fourth Embodiment)

Figure 6:
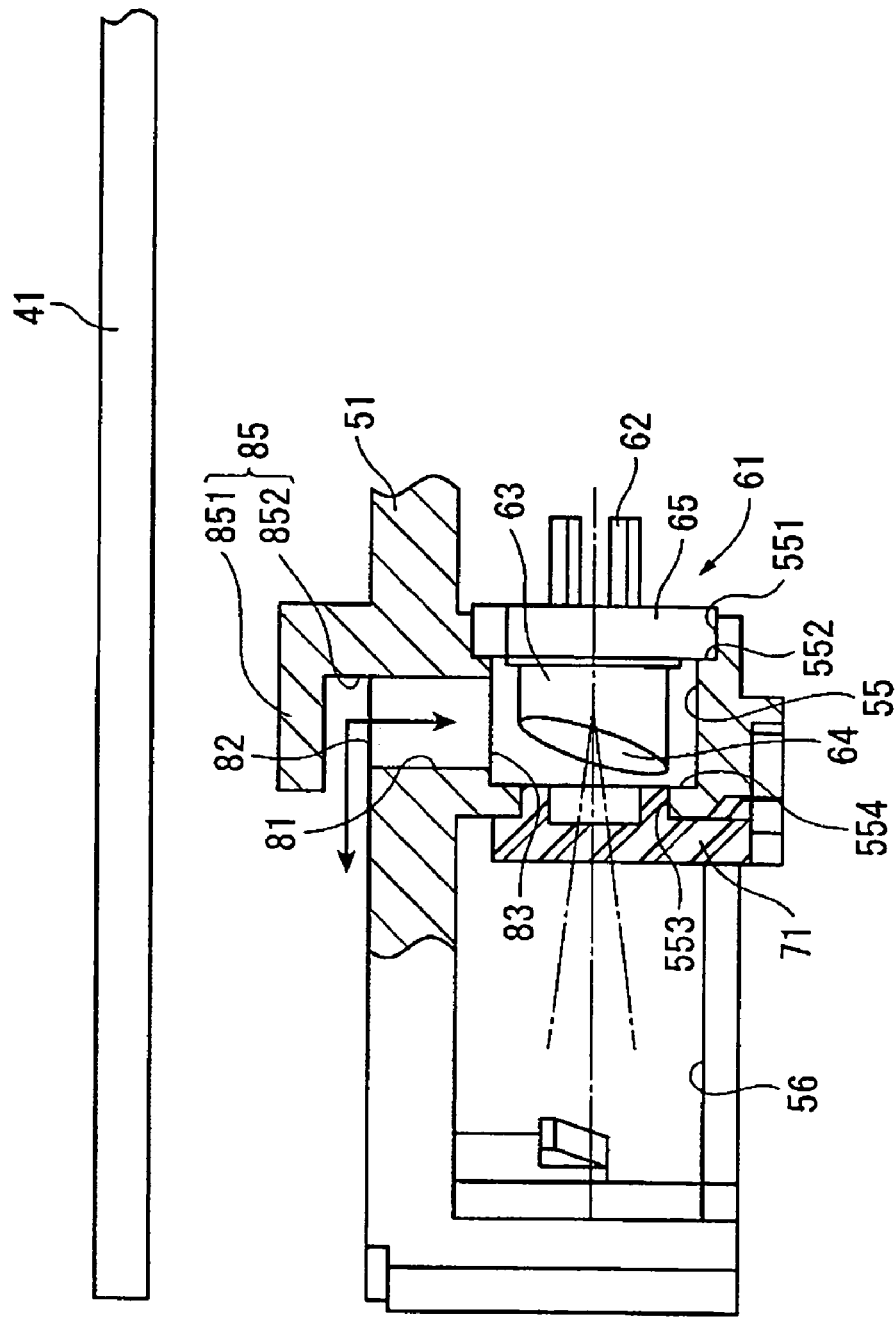
FIG. 6 is a cross-sectional view showing a fourth embodiment of the present invention, corresponding to FIG. 3.

FIG. 6 shows a fourth embodiment of the present invention. The basic structure of the fourth embodiment is the same as the first embodiment. The fourth embodiment, however, differs from the first embodiment in that a dust guard 85 is included as a dust-proof unit.

The dust guard 85 includes a dust guard roof 851, which is provided opposed to and at a predetermined distance from the outer opening 82 and having an area covering the opening area of the outer opening 82, and an air flow receiver surface 852 which receives the flow of the air generated by rotation of the optical disk 41.

The dust guard 85 may be formed to be integral with the pickup base 51. Alternatively, the dust guard 85 may be provided separately on the pickup base 51 according to the first embodiment.

According to this structure, the following advantages can be achieved in addition to the advantages (1) to (7) and (9) of the foregoing embodiments.

(10) The heat radiation path 81 includes the dust-proof unit which prevents dust from flowing into the communication hole 55 through the heat radiation path 81 from outside.

In this structure, the dust-proof unit can prevent dust from flowing into the communication hole 55 through the heat radiation path 81. If dust enters into the communication hole 55 and sticks to the laser emission surface 64 of the laser light source 61 and the grating 71, laser beams are shut off by the dust. If laser beams are shut off, data cannot be read out from the optical disk 41.

However, according to the present embodiment, the dust-proof unit can prevent dust from entering into the communication hole 55, and heat from the laser light source 61 can be radiated from the communication hole 55 by the heat radiation path 81.

(11) The dust-proof unit is the dust guard 85 which is provided opposed to and at a predetermined distance from the outer opening 82 of the heat radiation path 81 open to the outside of the communication hole 55, and which covers at least the opening area of the outer opening 82.

In this structure, the dust guard 85 can prevent dust from entering into the heat radiation path 81. The dust guard roof 851 of the dust guard 85 is provided at a predetermined distance from the outer opening 82, so that the distance allows the air to flow in and out through the heat radiation path 81. In addition, the dust guard roof 851 of the dust guard 85 covers the outer opening 82, so that dust entering into the heat radiation path 81 can be prevented.

(Fifth Embodiment)

Figure 7:
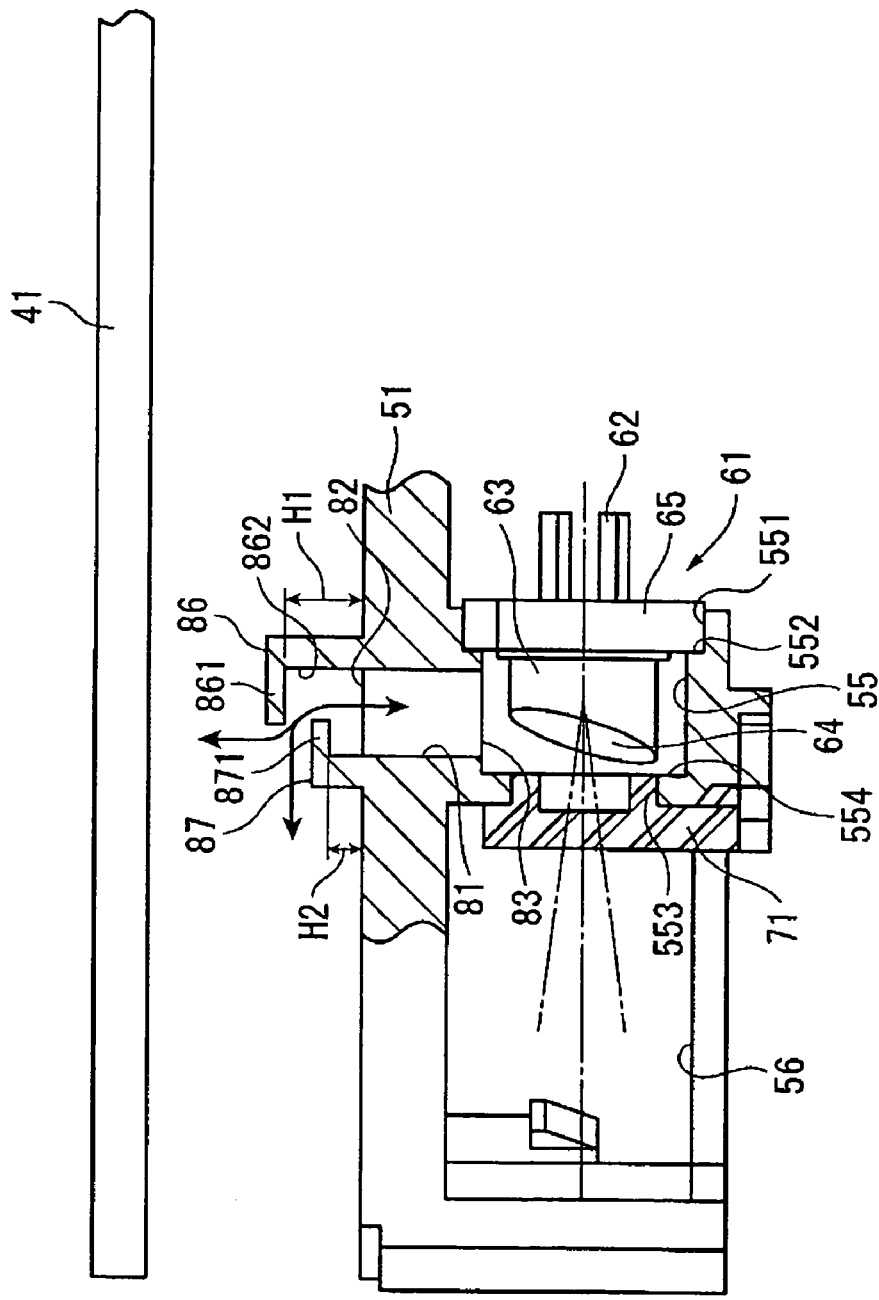
FIG. 7 is a cross-sectional view showing a fifth embodiment of the present invention, corresponding to FIG. 3.

FIG. 7 shows a fifth embodiment of the present invention. The basic structure of the fifth embodiment is the same as the fourth embodiment. The fifth embodiment, however, differs from the fourth embodiment in that the dust-proof unit is constituted by including first and second dust guards 86 and 87.

The first dust guard 86 includes a first dust guard roof 861 provided at a first distance H1 from the outer opening 82, and an air flow receiver surface 862 which receives the air flow generated by the optical disk 41. The second dust guard 87 includes a second dust guard roof 871 provided at a second distance H2 from the outer opening 82, and the second distance H2 is shorter than the first distance H1. The second dust guard roof 871 has an area which covers the other part of the outer opening 82 than the part covered by the first dust guard roof 861. That is, all part of the outer opening 82 is covered by the combination of the first and second dust guard roofs 861 and 871. Desirably, the first and second dust guard roofs 861 and 871 respectively cover substantial halves of the outer opening 82.

The first dust guard 86 faces the flow of the air generated by rotation of the optical disk 41, and introduces the received air flow into the heat radiation path 81. For example, the first dust guard 86 is provided on the peripheral edge of the outer opening 82 in the far side from the rotation center of the optical disk 41.

In this structure, the following advantage can be achieved in addition to the advantages (1) to (7) and (9) to (11) of the foregoing embodiments.

(12) The dust-proof unit includes the first dust guard 86 provided at the first distance H1 from the outer opening 82 and covering part of the opening area of the outer opening 82, and the second dust guard 87 provided at the second distance H2, which is shorter than the first distance H1, from the outer opening 82 and covering at least the other part of the outer opening 82 than the part covered by the first dust guard 86.

In this structure, the first and second dust guards 86 and 87 can prevent dust from flowing into the communication hole 55 through the heat radiation path 81. Further, the outward flow of the air from the heat radiation path 81 is curved at an angle of 90 degrees, for example, in the case that the outer opening 82 is covered with one roof (see the fourth embodiment). In contrast, the outward flow of the air from the heat radiation path 81 does not bent so much in the present embodiment. Accordingly, the air heated by the heat from the laser light source 61 easily goes out of the heat radiation path 81. Inversely, the air from the outside easily flows into the communication hole 55 through the heat radiation path 81. Therefore, dust can be prevented from entering into the communication hole 55, and heat from the laser light source 61 can be radiated efficiently.

When viewed in the direction from the heat radiation path 81, the first dust guard roof 861 and the second dust guard roof 871 may overlap each other. In this structure, dust entering into the heat radiation path 81 can be prevented more steadily.

(Sixth Embodiment)

Figure 8:
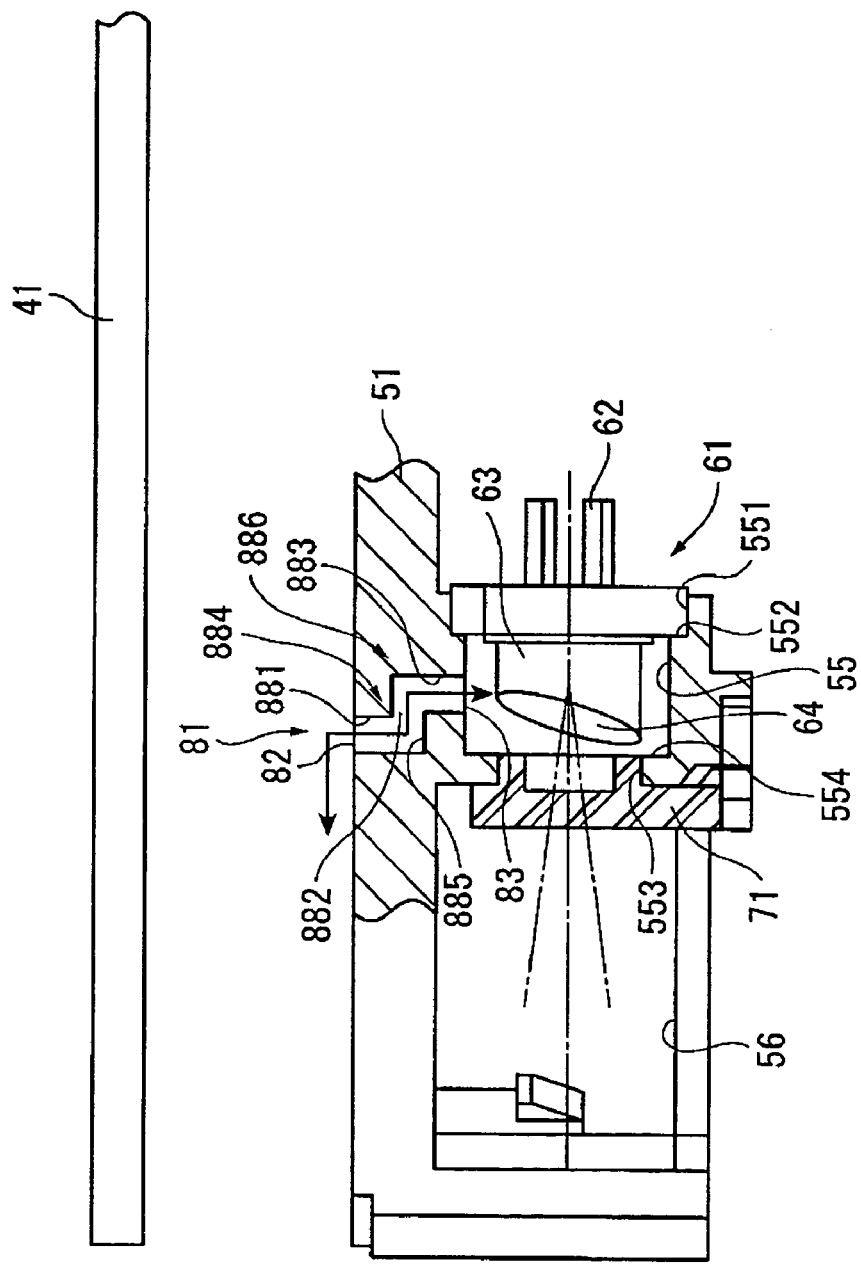
FIG. 8 is a cross-sectional view showing a sixth embodiment of the present invention, corresponding to FIG. 3.

FIG. 8 shows a sixth embodiment of the present invention. The basic structure of the sixth embodiment is the same as the first embodiment. The sixth embodiment, however, differs from the first embodiment in that the heat radiation path 81 is bent.

The heat radiation path 81 has a first vertical hole 881 formed from the outer opening 82 toward the communication hole 55. The first vertical hole 881 communicates with a horizontal part 882 substantially parallel to the communication hole 55, via a first bent part 884 which is bent at 90 degrees. The horizontal part 882 communicates with a second vertical hole 883 continuous to the inner opening 83, via a second bent part 886 which is bent at 90 degrees. The horizontal part 882 is bent at the first bent part, forming an inner wall surface 885 which is opposed to the outer opening 82.

According to this structure, the following advantage can be achieved in addition to the advantages (1) to (7) of the foregoing embodiments.

(13) The heat generation path 81 is bent forming the inner wall surface 885 opposed to the outer opening 82, between the outer opening 82 and the inner opening 83.

In this structure, the air heated by the heat from the laser light source 61 goes to the outside through the heat radiation path 81, and the air from the outside is let flow into the communication hole 55 through the heat radiation path 81. In addition, dust entering into the heat radiation path 81 from the outside is stopped by the inner wall surface 885 opposed to the outer opening 82, and thus prevented from entering into the communication hole 55. Accordingly, heat in the communication hole 55 which is generated from the laser light source 61 can be radiated, and simultaneously, dust is prevented from entering into the communication hole 55 through the heat radiation path 81.

(Seventh Embodiment)

Figure 9:
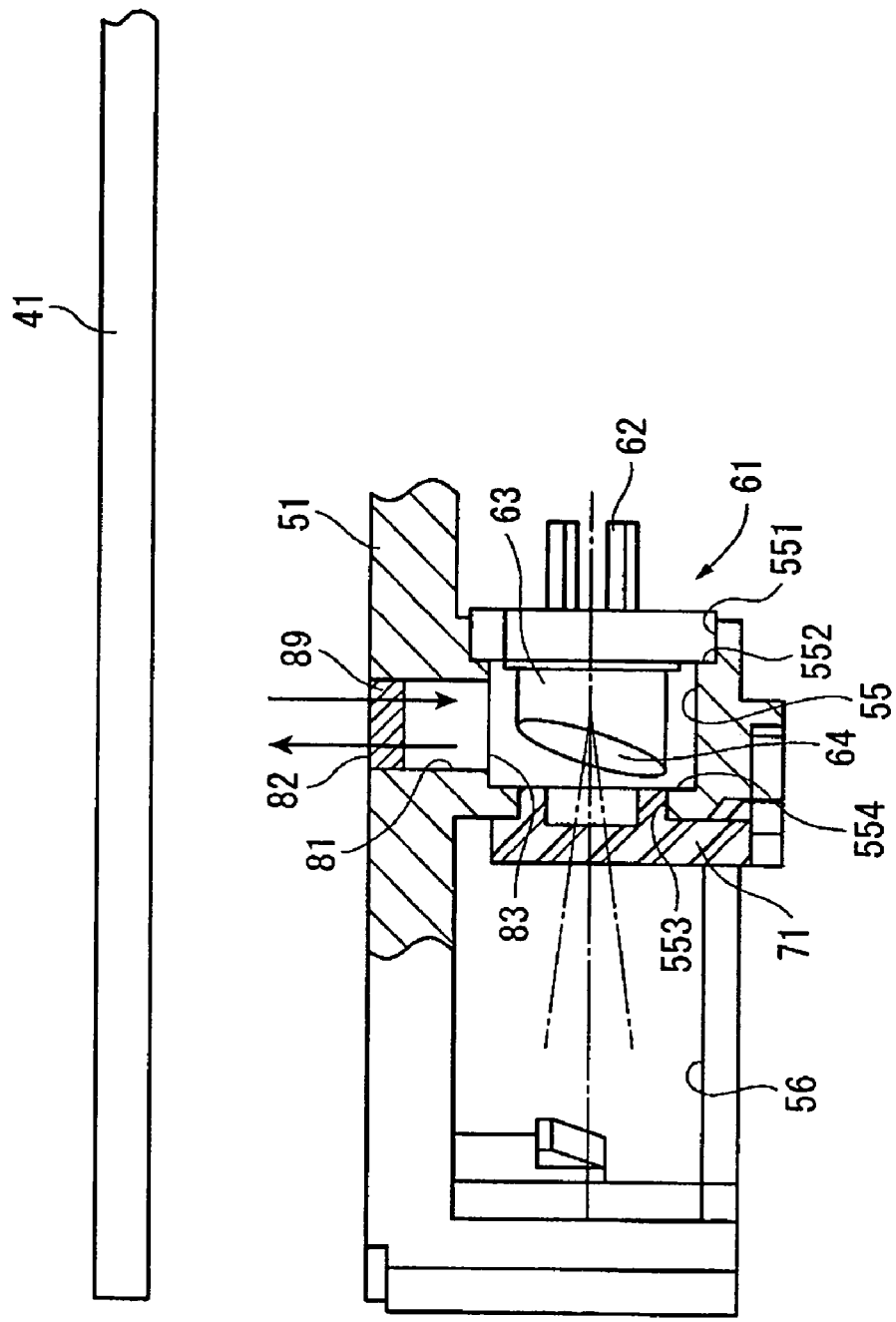
FIG. 9 is a cross-sectional view showing a seventh embodiment of the present invention, corresponding to FIG. 3.

FIG. 9 shows a seventh embodiment of the present invention. The basic structure of the seventh embodiment is the same as the first embodiment. The seventh embodiment, however, differs from the first embodiment in that the heat radiation path 81 is provided with a filter 89 as a dust-proof unit.

The filter 89 has such a mesh that allows the air to pass through and shuts out dust, and is provided at the outer opening 82.

According to this structure, the following advantage can be achieved in addition to the advantages (1) to (7) of the foregoing embodiments.

(14) As a dust-proof unit, the filter 89 is provided in the heat radiation path 81.

In this structure, the air exchanges between the communication hole 55 and the outside via the heat radiation path 81, while the filter 89 prevents dust from entering into the communication hole 55 through the heat radiation path 81. If dust is prevented by providing a roof or the like at the outer opening 82, it is impossible to prevent perfectly dust from flowing into the communication hole 55 together with the air. By providing the filter 89 as in the present embodiment, however, dust flowing into the communication hole 55 together with the air can be prevented securely.

Note that the position of the filter 89 is not particularly limited as long as the filter 89 is provided in the heat radiation path 81. For example, the filter 89 may be provided at the inner opening 83.

(Eighth Embodiment)

Figure 10:
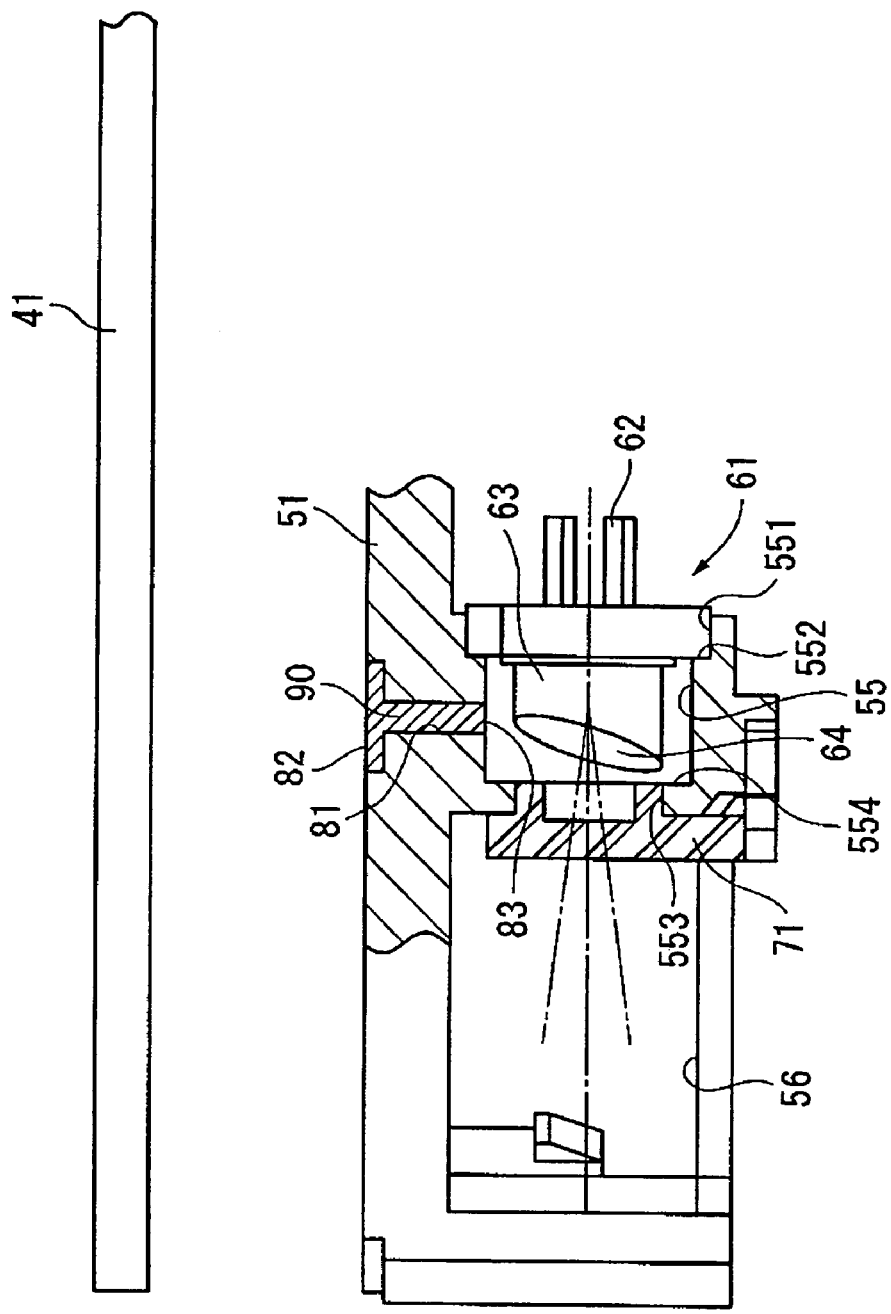
FIG. 10 is a cross-sectional view showing an eighth embodiment of the present invention, corresponding to FIG. 3.

FIG. 10 shows an eighth embodiment of the present invention. The basic structure of the eighth embodiment is the same as the first embodiment. The eighth embodiment, however, differs from the first embodiment in that a heat transfer agent 90 is filled as a dust-proof unit in the heat radiation path 81.

The heat transfer agent 90 absorbs heat in the communication hole 55 and radiates the heat to the outside. This agent is gel and is filled in the heat radiation path 81. The heat transfer agent 90 is viscous enough to stay in the heat radiation path 81 without falling into the communication hole 55 after the agent is filed in the heat radiation path 81. As the heat transfer agent 90, for example, λ GEL (registered trademark) heat transfer agent having a heat conductivity of 6.5 (W/mK) or so is applicable.

According to this structure, the following advantage can be achieved in addition to the advantages (1) to (7) of the foregoing embodiments.

(15) The heat radiation path 81 is filled inside with the heat transfer agent 90.

In this structure, heat in the communication hole 55 from the laser light source 61 is absorbed by the heat transfer agent 90 and then radiated to the outside. Accordingly, increase in temperature of the laser light source 61 can be prevented. In the present embodiment, the air does not flow in or out through the heat radiation path 81, and therefore, dust does not enter into the communication hole 55 through the heat radiation path 81. Further, if a heat transfer agent 90 having a high heat conductivity is used, heat of the laser light source 61 can be efficiently radiated.

(Modifications)

Incidentally, the pickup device according to the present invention is not limited to the foregoing embodiments but may be modified variously without deviating from the subject matter of the present invention.

For example, the outer opening 82 of the heat radiation path may be opened downward during normal use of the pickup device 5. In this structure, dust is hindered from entering into the heat radiation path 81 since the outer opening 82 is oriented downward.

In the foregoing embodiments, the grating 71 is provided as an optical element. However, the optical element is not limited to any particular type as long as the optical element can receive laser beams from the laser light source 61 with the communication hole 55 interposed therebetween. For example, the optical element may be a wavelength plate or a lens.

The heat radiation path 81, of course, may have any arbitrary cross-sectional shape and is not limited to any particular shape such as a circle, triangle, rectangle, or the like. The diameter of the heat radiation path 81 may decrease from the side of inner opening 83 toward the outer opening 82 or may increase on the contrary.

Various combinations of the foregoing embodiments may be applicable, of course. For example, the air flow receiver 84 as shown in the third embodiment may be provided, and the filter 89 as shown in the seventh embodiment may be provided together. In this case, two heat radiation paths may further be provided like the second embodiment. Alternatively, plural heat radiation paths each filled with the heat transfer agent may be provided, or plural heat radiation paths each having the dust guard roof may be provided.

What is claimed is:

1. A pickup device comprising:
   a light source which irradiates light beam onto an optical recording medium; and
   a casing including an optical element provided in an optical path oriented from the light source to the optical recording medium, and a communication hole having an end at which the light source is provided and an another end at which the optical element is provided, the communication hole connecting the light source to the optical element, wherein
   the communication hole has a heat radiator which radiates, to outside, heat between the light source and the optical element,
   wherein the heat radiator is a heat radiation path which is formed across an axis of the communication hole and connects inside of the communication hole to the outside of the communication hole, and
   wherein a heat radiation path is open to a rotation surface of the optical recording medium.

2. The pickup device according to claim 1, wherein
   the heat radiation path includes at least a set of paths whose center axes are substantially collinear with each other.

3. The pickup device according to claim 1, wherein
   an air flow receiver having a wall facing an air flow generated by rotation of the optical recording medium is provided at an edge of an opening of the heat radiation path, which is open to the rotation surface of the optical recording medium.

4. The pickup device according to claim 1, wherein
   the heat radiation path has an outer opening open to the outside of the communication hole, the outer opening being open upward during normal use of the pickup device.

5. The pickup device according to claim 1, wherein
   the heat radiation path has an outer opening open to the outside of the communication hole, the outer opening being open downward during normal use of the pickup device.

6. The pickup device according to claim 1, wherein
the heat radiation path has a dust-proof unit which prevents dust from flowing into the communication hole through the heat radiation path from the outside.

7. The pickup device according to claim 6, wherein
the dust-proof unit is a dust guard provided at a predetermined distance from an outer opening of the heat radiation path, which is open to the outside of the communication hole, the dust guard covering at least an opening area of the outer opening.

8. The pickup device according to claim 6, wherein
the dust-proof unit has a first dust guard provided at a first distance from the outer opening and covering at least part of the opening area of the opening, and a second dust guard provided at a second distance from the outer opening and covering the other part of the opening area of the outer opening than the part covered by the first dust guard, the second distance being different from the first distance.

9. The pickup device according to claim 6, wherein
the dust-proof unit is a filter provided in the heat radiation path.

10. The pickup device according to claim 1, wherein
the heat radiation path is bent forming an inner wall surface opposed to the outer opening between an outer opening of the communication hole, which is open to the outside, and an inner opening of the communication hole, which is open to inside.

11. The pickup device according to claim 1, wherein
a heat transfer agent is filled in the heat radiation path.

* * * * *